United States Patent [19]
Shimokawa

[11] Patent Number: 5,798,836
[45] Date of Patent: Aug. 25, 1998

[54] OPTICAL DISTANCE MEASURING APPARATUS AND METHOD THEREFOR

[75] Inventor: Yoshiyuki Shimokawa, Tokyo, Japan

[73] Assignee: Kabushiki Kaisha Toshiba, Kawasaki, Japan

[21] Appl. No.: 751,021

[22] Filed: Nov. 15, 1996

[51] Int. Cl.[6] .................................................. G01B 11/02
[52] U.S. Cl. ................................... 356/375; 356/3.08
[58] Field of Search ........................... 356/375, 3.02, 356/3.03, 3.04, 3.05, 3.06, 3.07, 3.08; 250/201.6

[56] References Cited

U.S. PATENT DOCUMENTS

| | | | |
|---|---|---|---|
| 3,671,726 | 6/1972 | Kerr | 356/381 |
| 4,708,483 | 11/1987 | Lorenz . | |
| 5,264,791 | 11/1993 | Morizumi | 250/201.6 |

FOREIGN PATENT DOCUMENTS

| | | | |
|---|---|---|---|
| 63-225117 | 9/1988 | Japan | 356/375 |

OTHER PUBLICATIONS

Optics and Laser Technology, Feb. 1988, vol. 20, No. 1, pp. 19–24, P. Cielo et al., "Improvement of Subpixel Resolution in Triangulation . . . Imaging".
Measurement and Control, Dec. 1983, UK, vol. 16, No. 12, pp. 468–470, M. Fabian, "Optical Measurement Techniques Using Laser Diodes. II".

*Primary Examiner*—Richard A. Rosenberger
*Attorney, Agent, or Firm*—Foley & Lardner

[57] ABSTRACT

In a distance measuring apparatus, a plurality of line beams transmitted from a light source irradiate objects to form a plurality of images on the objects. Linear light sensors receive the plurality of images and generate a plurality of electric signals corresponding to the quantity of received light. A distance calculator portion carries out a product-sum operation using a predetermined function based on the plurality of electric signals, estimates a function to approximate a location of an image from a result of the product-sum operation, and calculates a distance to the object. Thus, the distance to the object can be measured at high speed and with high precision.

7 Claims, 8 Drawing Sheets

CONVENTIONAL LIGHT SOURCE

→ X

LIGHT SOURCE IN THE FIRST EMBODIMENT

→ X

LIGHT SOURCE IN THE FIRST EMBODIMENT

1

OPTICAL DISTANCE MEASURING APPARATUS AND METHOD THEREFOR

BACKGROUND OF THE INVENTION

1. Field of the Invention

The present invention relates to an optical distance measuring equipment and method and, more particularly an optical distance measuring equipment and method capable to measure a distance to a measuring object on a non-contact basis in a steel sheet plant, etc.

2. Description of the Prior Art

Conventionally the optical triangulation system has been used as a system for measuring the distance to a measuring object on a non-contact basis. According to the optical triangulation system, a light beam emitted from a distance measuring equipment is reflected by a measuring object, then a location of the reflected light is detected by an optical sensor, and then a distance from the distance measuring equipment to the measuring object is detected. Although PSD (position sensitive photo-semiconductor device), CCD, or the like has been used as a particular example of the sensor, the CCD with a large number of photo-diodes to receive reflected lights would be used for high precision.

FIG. 1 shows a configuration of an optical distance measuring equipment in the prior art.

As shown in FIG. 1, a light emitted from a light source 101 is focused by an objective lens 103 and irradiates a measuring object as a light beam 110. Assuming that the measuring object is located at a point A or a point B, a light beam reflected from the measuring object forms an image on a point (a) or a point (b) of a CCD 105 serving as linear light sensor devices via a focusing lens 104. Where reference numerals 111 and 112 denote linear paths of reflected light beams from the points A and B respectively.

When the location of the measuring object is varied, such variation in the location of the measuring object appears as variation in a location of the light beam which is formed on the linear CCD 105. Therefore, the location of the measuring object can be detected by calculating this variation in the location of the light beam. In order to calculate the location of the measuring object, electric signals generated by respective photo-diodes on a light receiving surface of the linear CCD 105 are converted into respective digital values by an AD converter 106, and a microcomputer 108 then stores these digital values in storing means and calculates the location of the measuring object in accordance with these stored digital values.

FIG. 2 is a characteristic diagram schematically illustrating a relationship between the location Z of the light receiving surface of the linear CCD 105 and quantity P(Z) of received light in the prior art.

In FIG. 2, black round marks denote values detected by respective elements of the CCD 105, and a solid line denotes an approximate curve to connect these values. The microcomputer 108 calculates a center-of-gravity location of quantity of light detected by respective elements and connected by the solid line and then detects an image forming location Zp. That is, $$Zp = \frac{Z \cdot P(Z)}{\Sigma P(Z)} \quad (1)$$

where Z is a location of the light receiving surface of the linear CCD 105, and P(Z) is quantity of light in the location Z.

Then the microcomputer 108 calculates a geometrical relationship between the image forming location Zp and the measuring object in FIG. 1 and detects the location of the measuring object in the end.

However, in the conventional optical distance measuring equipment, its measuring precision is not so high since problems discussed hereinbelow exist.

1) Reflectivity is not uniform over an entire surface of the measuring object. Therefore, the center-of-gravity location cannot be calculated precisely since the curve of quantity of light P(Z) is deformed due to variation in reflectivity on respective measuring locations. For instance, in the event that the curve is deformed as indicated by a dotted line in FIG. 2, the center-of-gravity location shifts correspondingly. This means that, in the case that a distance to a steel sheet continuously running through the steel sheet plant, for example, is to be measured, it is not feasible to detect the distance precisely.

2) Assume that the distance from the light source to the measuring object is L and the light source rotates by an infinitesimal angle δθ, a light spot on the measuring object shifts by L δθ. In other words, since the infinitesimal rotation of the light source is amplified and then appears on the measuring object, the measured distance is rendered incorrect.

3) In order to achieve the high precision measurement, there is necessity of using a coherent light which is equal in wavelength and phase as a light source. However, if such coherent light beam is irradiated, light beams reflected from the measuring object interfere with each other because of surface unevenness of the measuring object to thus generate speckles. Such speckles then cause disturbance in the curve of quantity of light P(Z), so that the center-of-gravity location shifts correspondingly.

4) Since the center-of-gravity location of a single light spot is measured, precision in measurement cannot be improved.

SUMMARY OF THE INVENTION

Therefore, it is an object of the present invention to provide a distance measuring equipment and method capable to measure a distance to a measuring object at high speed and with high precision.

According to an aspect of the present invention, there is provided a distance measuring equipment comprising a light source for transmitting a plurality of line beams to irradiate a measuring object, a linear light sensor being set perpendicularly to a direction of a line of the line beams for receiving a plurality of images which are formed by the line beams on the measuring object, and distance calculating unit for carrying out product-sum operation using a predetermined function based on electric signals generated correspondingly to a distribution of a quantity of a light which is received by the linear light sensor, estimating a function to approximate to a precise location of the images from a result of the product-sum operation, and calculating a distance to the measuring object.

In the preferred embodiment of the present invention, the distance calculating unit carries out the product-sum operation using a function having a plurality of peaks corresponding to the distribution of the quantity of the light to be received by the linear light sensor as the predetermined function so as to calculate convolution or correlation.

In the preferred embodiment of the present invention, it employs a plurality of the linear light sensors.

According to another aspect of the present invention, there is provided a distance measuring method comprising the steps of transmitting a plurality of line beams from a light source, receiving by means of a linear light sensor images which are formed on a measuring object to correspond to the plurality of line beams, carrying out product-sum operation using a predetermined function based on electric signals generated correspondingly to a distribution of a quantity of a light which is received by the linear light sensor, estimating a function to approximate to a location of image from a result of the product-sum operation, and calculating a distance to the measuring object.

According to still another aspect of the present invention, there is provided a distance measuring method comprising the steps of arranging at least two of the distance measuring equipments on both sides of a sheet-like measuring object, calculating distances from respective distance measuring equipments to the sheet-like measuring object, and calculating a thickness of the sheet-like measuring object based on the distances calculated by the distance measuring equipments.

In operation, according to an aspect of the present invention, a plurality of line beams transmitted from the light source irradiate the measuring object and form a plurality of images on the measuring object. The linear light sensor receives the plurality of images and generates a plurality of electric signals corresponding to the quantity of received light distributed along a line perpendicularly crossing the plurality of images. The distance calculating unit carries out product-sum operation using a predetermined function based on the distribution of the plurality of electric signals from the linear light sensor, estimates a function to approximate to a precise location of the images from the result of the product-sum operation, and calculates the distance to the measuring object.

In addition, according to the preferred embodiment, the distance calculating means carries out the product-sum operation using a function having a plurality of peaks corresponding to the distribution of the plurality of images as the predetermined function so as to calculate convolution or correlation.

Further, according to the preferred embodiment, it employs a plurality of linear light sensors. As a result, as shown in FIG. 6, even if two linear light sensors P, Q recognize in error a location R as the true location O of the measuring object, the true location O can be detected by corrective calculation.

In operation, according to another aspect of the present invention, a plurality of line beams are transmitted from the light source, then images which are formed on the measuring object by the plurality of line beams emitted from the light source are received by means of the linear light sensor, then the product-sum operation is carried out using a predetermined function based on a plurality of electric signals generated correspondingly to the distribution of the quantity of the received light by the linear light sensor, then a function to approximate to the precise location of the images is estimated from the result of the product-sum operation, and then the distance to the measuring object is calculated.

In operation, according to still another aspect of the present invention, at least two of the distance measuring equipments are arranged on both sides of the sheet-like measuring object, then distances from respective distance measuring equipments to the sheet-like measuring object are calculated, and then a thickness of the sheet-like measuring object is calculated based on the distances calculated by the distance measuring equipments.

Other and further objects and features of the present invention will become obvious upon an understanding of the illustrative embodiments to be described in connection with the accompanying drawings or will be indicated in the appended claims, and various advantages not referred to herein will occur to one skilled in the art upon employing of the invention in practice.

DETAILED DESCRIPTION OF THE EMBODIMENTS

Prior to explanations of respective embodiments of the present invention, a fundamental technical concept applied to the present invention will be explained. More particularly, in order to measure a distance to a planar measuring object at high speed and with high precision, following means are employed in the present invention.

1) A light source generating a plurality of line beams simultaneously is used and plural distance measurements are carried out concurrently. By employing the light source instead of the spot light source (prior art) to a line light source (present invention), the range of the measuring object can be extended and influence of speckles and uneven reflectivity can also be reduced. Still further, by effecting measurement with the use of a plurality of line beams, the same effect as that can be attained by carrying out plural measurements at once can be achieved to thus improve precision in measurement. In this case, it is preferable to use laser light beams as the light source.

2) Images of a plurality of line light beams are formed on a linear light sensor such as a linear CCD. While displacing the location Z in a function Q(Z) to (k–Z) and changing Z throughout the overall range, product-sum operation between a predetermined function Q(Z) having a plurality of peaks, each of which is to be set so as to correspond to the location of the image of each line beam, and quantity data P(Z) of light on locations Z of respective light sensing elements of the linear light sensor is carried out in order to calculate values R(k).

The operation is to be carried out within necessary range of k and then, the highest value of R(k) is derived through approximation to a quadratic function or a spline function. Further, the location Z wherein the highest product-sum operation value R(k) to be derived is calculated out up to a small order less than the size of one sensing element of the linear light sensor (e.g., 1/10 order of the size of one element. "Less than the size of one element" is referred to as "subpixel" hereinafter). Here, it should be assumed that the function Q(Z) may be considered such that a plurality of peaks may most readily detected from quantity data of light and also influence of valley portions is reduced.

3) As explained in the above items 1) and 2), while the location Z is able to be detected up to the subpixel order with high precision, the problems of deterioration in precision of measurement owing to other errors arise.

Therefore, by providing a plurality of (for example, two) linear light sensors to form images, shift in the beam due to vibration of the light source and shift in the images due to uneven reflectivity can be corrected in terms of calculation.

Preferred embodiments of the present invention will be explained in detail hereinbelow.

(A) First Embodiment

Figure 3:
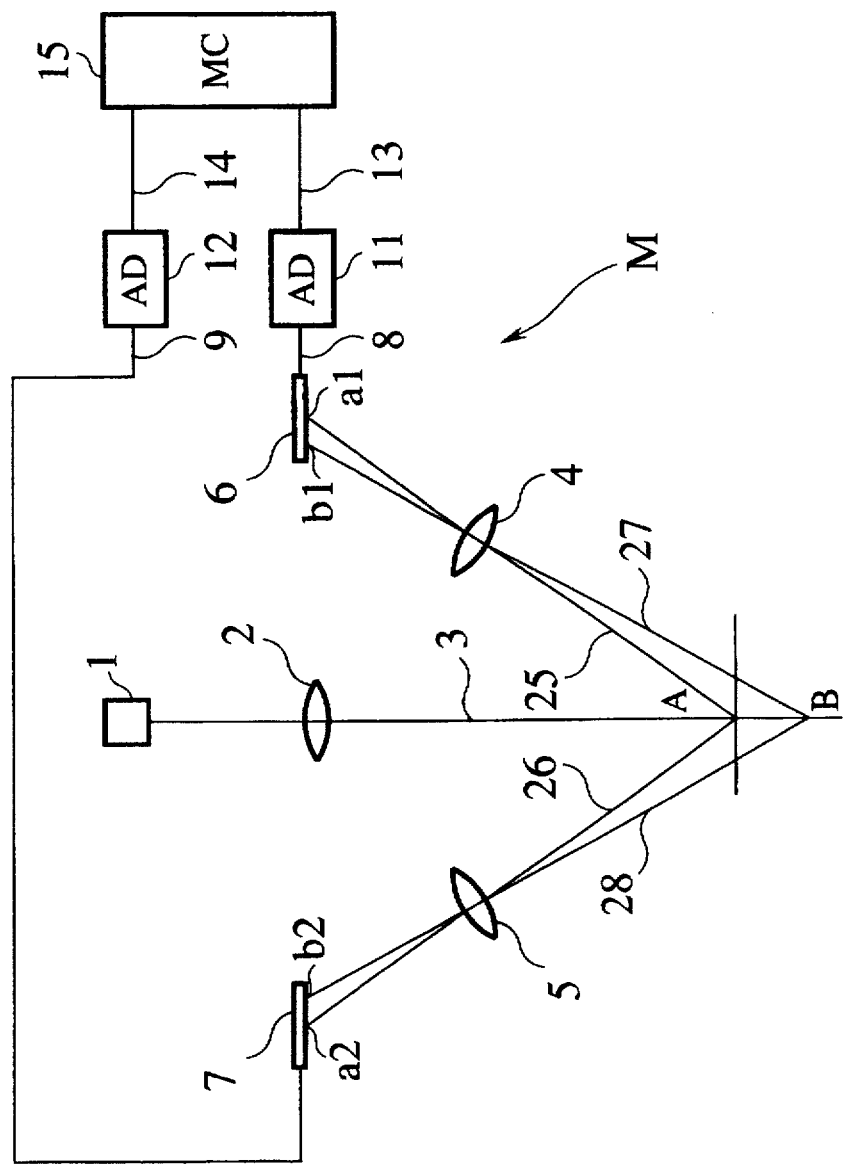
FIG. 3 is a schematic view showing a configuration of a distance measuring equipment according to the first embodiment of the present invention.

FIG. 3 shows a configuration of a distance measuring equipment according to the first embodiment of the present invention.

First a schematic configuration and a schematic operation of the measuring equipment M of the first embodiment will be outlined, and then respective elements such as the light source will be explained in detail.

As shown in FIG. 3, a plurality of line-like lights (line beams, see FIGS. 4B and 4C) emitted from a light source 1 are collected by an objective lens 2 to form a light beam 3 which irradiates measuring objects such as points A and B. Reflected lights from the measuring objects are collected by focusing lenses 4, 5 to form images a1, b1 and images a2, b2 on first and second linear light sensors 6, 7 such as a linear CCD respectively. The first and second linear light sensors 6, 7 are arranged symmetrically with respect to the light beam 3 emitted from the light source 1. Further, respective linear light sensors are set perpendicularly to the direction of the line of the line beams so as to cross the images on the measuring objects.

Quantity-of-light signals detected by the first and second linear light sensors 6, 7 are supplied to A/D converters 11, 12 via signal lines 8, 9 to be converted into digital values. The digital values are then supplied to a microcomputer 15 via signal lines 13, 14, so that a distribution of quantity data P(Z) of light are stored in a memory of the microcomputer 15. Where references 25 to 28 denote linear paths of reflected light beams from respective measuring objects at points A and B.

As described later in detail with reference to FIGS. 5A to 5E, the quantity data P(Z) of light are used in calculating the product-sum operation for the function Q(Z) and in calculating convolution. Subsequently, they are approximated by making the use of quadratic function, spline function, etc. to calculate central locations of the quantity of light. Since there are two central locations, a final central location can be detected in terms of a method described later.

The recent remarkable progress in semiconductor technology makes it possible to carry out high precision calculation such as 32 bit operation. A one chip microcomputer with high integration density into which memories and peripheral circuits are also incorporated is available at low cost. For this reason, a large number of product-sum operations and complicated approximate calculations can be carried out in an extremely short time and as a result the present invention can be put into practical use.

Subsequently, respective elements will be explained in detail hereinbelow.

(1) Light source

Figure 4A:
FIG. 4A is a schematic view showing a conventional spot light source.

In the prior art, in order to improve resolving power to the measuring object of an arbitrary profile, a spot light source formed as small as possible has been used as the light source. Images being formed on the measuring object by the conventional light source are shown in FIG. 4A. However, if the measuring object has a planar shape like a steel sheet, following processes may be applied.

Figure 4B:
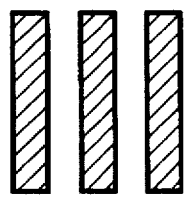
FIG. 4B is a schematic view showing a light source employed in the first embodiment.
Figure 4C:
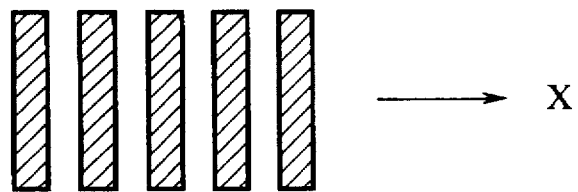
FIG. 4C is a schematic view showing another light source employed in the first embodiment.

1) To extend the measuring area of the measuring object without reduction in resolving power of the linear light sensor, light sources capable to transmit narrow line beams are used (see FIGS. 4B and 4C). If so constructed, variation in reflectivity and influence of speckles can be reduced by taking an average of measured results.

Figure 1:
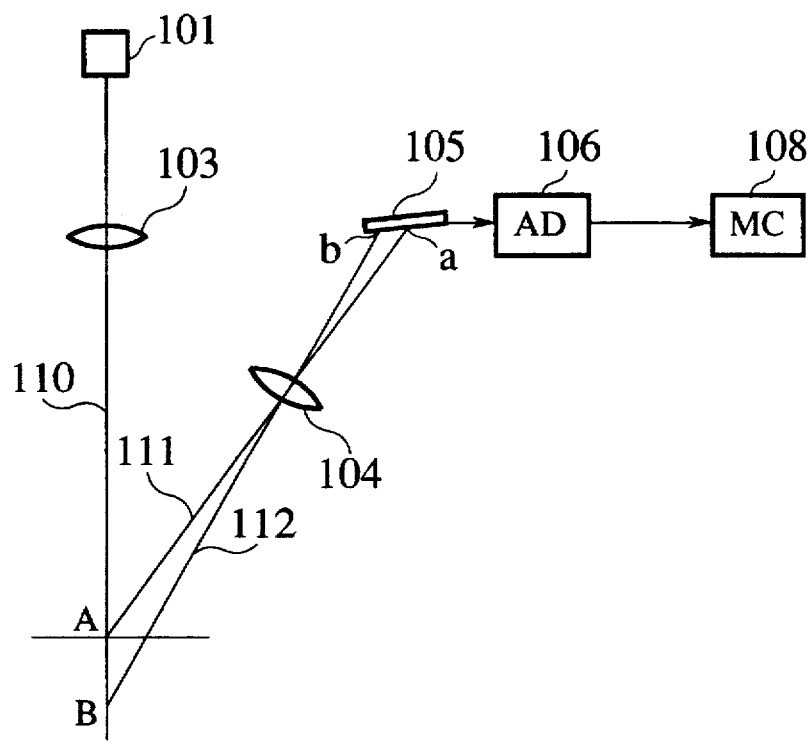
FIG. 1 is a schematic view showing a configuration of an optical distance measuring equipment in the prior art.
Figure 2:
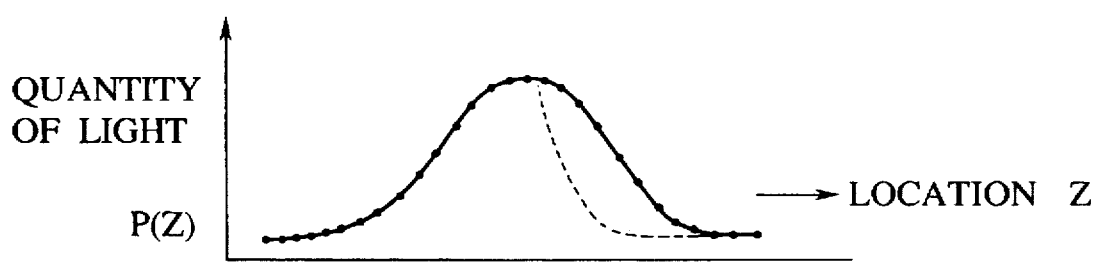
FIG. 2 is a schematic characteristic diagram illustrating a relationship between a location of a linear light sensor and a quantity of received light in the optical distance measuring equipment in the prior art.

2) Since the measuring object has a flat surface, measurement can be effected at plural points simultaneously. In other words, as shown in FIG. 4B, if the light source to form three line images is used, three peaks are formed on the linear light sensor so that an average distance can be derived from three peaks. On the contrary, since the distance has been calculated based on only one peak in the prior art as described above (see FIG. 2), the measured distance becomes imprecise.

In addition, as shown in FIG. 4C, the more the number of line images, the more the measurement precision can be improved. In FIG. 4C, a reference x denotes the direction of the linear arrangement of respective sensing elements in the linear light sensor.

(2) Distance calculation

A distance to the measuring object corresponds to the location of the images on the linear light sensor. In precise, according to the principle of triangulation, the distance can be calculated in accordance with the location of the images, the location of the linear light sensor, and the location of the light beam emitted from the light source. If limited narrow ranges are taken into account, the distance to the measuring object is in proportion to the location of the images. If a total range is then considered, the distance is a function of the location of the images. Accordingly, the distance to the measuring object can be calculated by detecting the location of the images.

As shown in FIG. 3, when the measuring objects are on locations A and B, images are formed on the points a1, b1 on the first linear light sensor 6 and images are also formed on the points a2, b2 on the second linear light sensor 7. Therefore, if the locations of images are calculated as described above, the distances can be derived from the geometrical relationship shown in FIG. 3.

Figure 5A:
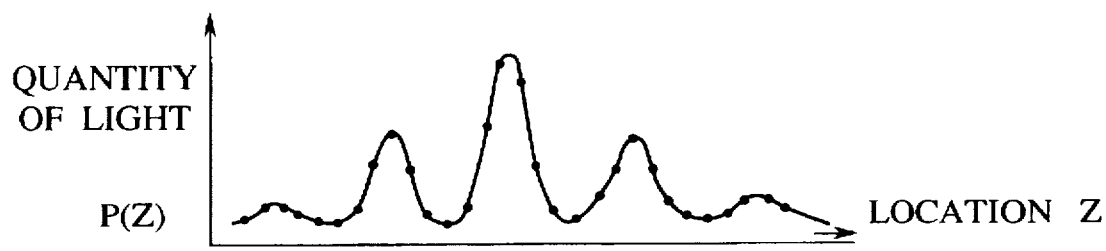
FIG. 5A is a characteristic diagram illustrating a relationship between location of a linear light sensor and distribution of a quantity of received light to explain a product-sum operation in the first embodiment.

As mentioned earlier, since the light source 1 employs a plurality of line light sources (FIG. 4B), quantity data P(Z) of light having a plurality of peaks can be detected, as shown in FIG. 5A. The black round marks denote quantity data P(Z) of light on respective elements of the linear light sensor. For clarity, these marks are connected by the approximate curve. In this example, since the light source generated due to diffraction which is caused by irradiating the laser beam to the slit is used, a central peak is high in amplitude and right and left peaks are low in amplitude. As the light source for generating a plurality of light beams, various means such as a combination of a laser and a prism may be used.

Figure 5B:
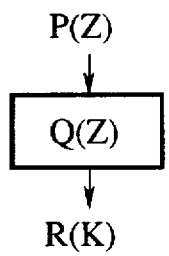
FIG. 5B is a conceptional view showing convolution operation.

In order to measure the distance on the basis of quantity data P(Z) of light, convolution R(k) can be calculated in terms of product-sum operation between the function Q(Z) and quantity data P(Z) of light (see FIG. 5B).

Figure 5C:
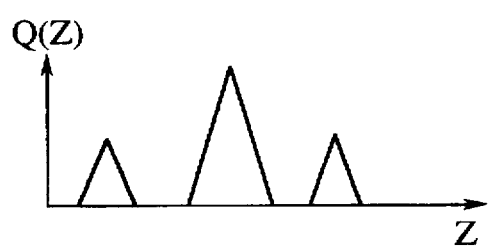
FIGS. 5C and 5D are characteristic diagrams illustrating approximate curves Q(Z) respectively.
Figure 5D:
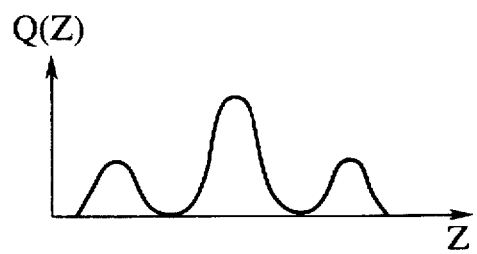

As the function Q(Z), a function is prepared and used like that of being able to triangulate the distances between peaks of the images formed on the linear light sensor by the light source and of having very small values corresponding to the portions of the images easily affected by noises. As shown in FIG. 5A, small peaks other than three major peaks appear if diffraction of light is employed in the light source 1. However, since peripheral data which being easily affected by noises would be taken if these small peaks are included in data, these small peaks should be deleted. That is, values in such range should be zero. As a particular example, a function expressed with straight lines for easy calculation is illustrated in FIG. 5C, but the function Q(Z) can be expressed with a curve as shown in FIG. 5D.

According to the product-sum operation between quantity data P(Z) of light and the function Q(Z), convolution R(k) is performed as follows.

$$R(k) = \sum_z P(Z) \cdot Q(k-Z) \quad (2)$$

Figure 5E:
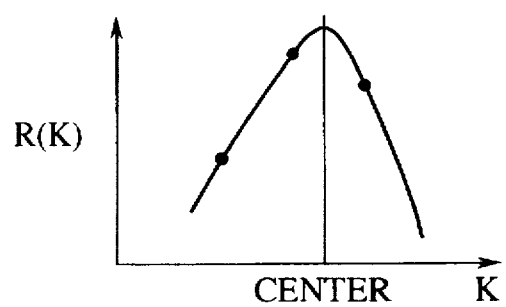
FIG. 5E is a schematic view showing a center location of convolution R(k)

Since in the equation (2) the function Q(Z) is symmetrical in the lateral direction (see FIGS. 5C, 5D), convolution R(k) reaches the maximum at the value k which provides the coincidence between peaks of quantity data P(Z) of light and peaks of the function Q(Z). However, as shown in FIG. 5E, based on approximation with the use of quadratic function or spline function, the central location may be calculated from several data around the maximum because the convolution R(k) is a discrete function. Since R(k) has been subjected to convolution process, it forms a peak particularly around the central location and it is very low at locations other than the central location.

Meaning of the function Q(Z) may be considered as follows.

1) By forming peaks corresponding to line light beams of the light source in the function, it can be available the quantity of light data P(Z) emphasizing the peak portions. In other words, a degree of influence to the peak portions can be increased in the data P(Z).

2) By forming areas having the small degree of influence in the function, the areas in which signals are seriously susceptible to influence of noises can be deleted. Namely, stray light caused by peaks usually appear in the valley portion between two peaks so that it is difficult to form a complete valley in the valley portion of the data P(Z). However, if the value is set to 0 or a small value at the portion corresponding to the valley portion, such influence can be remarkably reduced.

3) In summary, the central value k can be sharply calculated in terms of the most suitable function.

Besides, although the convolution has been calculated in the above product-sum operation, a correlation may also be calculated in a similar way. In this case, a following equation (3) is used.

$$R(k) = \sum_z P(Z) \cdot Q(Z+k) \quad (3)$$

The equation (3) is similar to the convolution in nature if the function Q(Z) is a laterally symmetrical function.

In addition, following merits can be accepted from the product-sum operation.

1) The central value of the distance can be easily calculated.

2) In place of firstly calculating a plurality of distances from individual peaks and then calculating a representative from the plurality of distances, the representative of a plurality of peaks can be calculated at once. In other words, quantity data P(Z) of light can be used effectively without loss compared to the distance calculation based on the individual peaks. Accurate data being less susceptive from the deformation of the peak portions can be collected.

According to the geometrical arrangement of the linear light sensors, such case sometimes occurs where images formed on the linear light sensor are not uniform over the full surface. Hence, in that case, the function Q(Z) has to be modified slightly in compliance with the location of images formed on the photodetector.

Since the product-sum operation needs a plenty of computational complexity, an amount of calculation can be reduced by calculating limited areas around the central location which are actually available.

(3) A plurality of linear light sensors

As described above, because of partial variation of reflectivity of the measuring object and vibration of the light source, the linear light sensor sometimes detects as if the measuring object has been shifted in the horizontal direction. In this case, the distance calculation effected by using a single linear light sensor tends to be incorrect.

In such case, if a plurality of linear light sensors are arranged, the true distance to the measuring object can be detected by corrective calculation. Such variation causes no problem in the prior art since merely the distance measuring equipment could be used with such low precision that no correction is required for such variation. But such variation cannot be ignored at present when the CCD device including a lot of light sensing elements or a plurality of line light sources is employed to measure the distance.

Therefore, corrections described later should be conducted. With the advent of microcomputer, as one factor, which can calculate 32 bit operation at low cost and high speed and with high precision, for example, such corrections can be realized actually.

These corrections will be explained with reference to FIG. 6.

Figure 6:
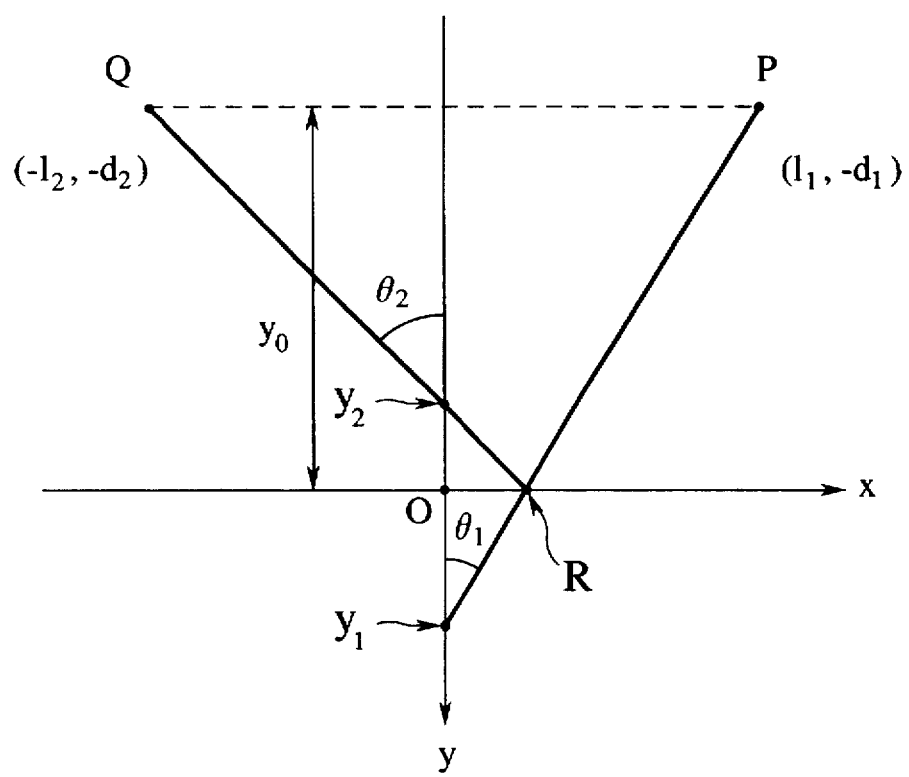
FIG. 6 is a graphical representation of a distance measuring scheme in the case that two linear light sensors provided in the first embodiment.

As shown in FIG. 6, it is assumed that an x axis is set along the horizontal direction while a y axis is set along the vertical direction, the light source 1 located on the y axis irradiates the measuring object, and the measuring object is measured on the y axis.

For simplicity of explanation, two linear light sensors P, Q are positioned at locations $(11, -d1)$ and $(-12, -d2)$ respectively, and angles $\theta 1$, $\theta 2$ between respective straight lines connecting the linear light sensors P, Q to the measuring object R and the y axis are detectable. Where values l1, l2, d1, and d2 are all positive.

Although actually the measuring object is located at a point O, the linear light sensors P, Q have measured the measuring object as if it is located at a point R due to partial variation of reflectivity. In turn, the linear light sensor P judges that the measuring object exists on a straight line connecting the point P to the point R, while the linear light sensor Q judges that the measuring object exists on a straight line connecting the point Q to the point R.

Then, locations of the measuring object in respective linear light sensors P, Q (the angle θ1 between the straight line PR and the y axis, and the angle θ2 between the straight line QR and the y axis) are given by following equations (4) and (5).

$$\tan \theta 1 = \frac{l1 - x}{y + d1} \quad (4)$$

$$\tan \theta 2 = \frac{l2 + x}{y + d2} \quad (5)$$

If y coordinate of an intersection point between both straight lines is calculated by eliminating x from the equations (4), (5), an equation (6) can be derived.

$$y = \frac{l1 + l2 - d1 \cdot \tan \theta 1 - d2 \cdot \tan \theta 2}{\tan \theta 1 + \tan \theta 2} \quad (6)$$

If intersecting points between both straight lines PR, QR and the y axis are set as y1, y2 respectively, distances to these points y1, y2 have to be detected individually by the linear light sensors P, Q. Values x1, x2 corresponding respectively to the y1, y2 are zero. By substituting these x1, x2, y1, y2 into the equations (4), (5) respectively, tan θ1 and tan θ2 become $$\tan \theta 1 = \frac{l1}{y1 + d1} \quad (7)$$

$$\tan \theta 2 = \frac{l2}{y2 + d2} \quad (8)$$

With the above results of operation, a distance y0 to be calculated in the y direction can be obtained by substituting the equations (7), (8) into the equation (6).

$$y0 = \frac{(l1 + l2)y1y2 + d1l2y2 + d2l1y1}{l2(y1 + y2) + l1(y2 + d2)} \quad (9)$$

Then, if it is assumed that the points P, Q are located symmetrically with respect to the y axis and d1=d2=d and l1=l2=l, a following equation (10) yields the distance y0.

$$y0 = \frac{y1 + y2}{2} - \frac{(y1 - y2)^2}{2(y1 + y2 + 2d)} \quad (10)$$

This equation (10) shows that the distance y0 from the linear light sensors P, Q consists of the first term providing an average value of y1 and y2 and the second term providing a correction term.

As described above, the true distance y0 from the linear light sensors P, Q to the measuring object located at the point O can be calculated.

Incidentally, such calculation can be readily carried out by using a powerful and cheap microcomputer.

(B) Second Embodiment

The second embodiment corresponds to the case where a thickness of a planar measuring object is to be measure.

1) Principle of thickness measurement

Figure 7A:
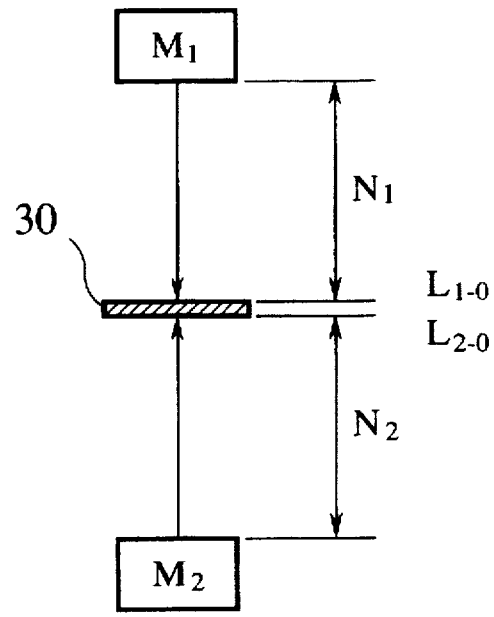
FIG. 7A is a schematic view showing measurement of a test piece to explain the principle of measurement applied to the second embodiment of the present invention.

In this case, as shown in FIG. 7A, two sets of measuring equipments M1, M2 having the same configuration as that of the measuring equipment M shown in FIG. 3 are arranged over and beneath a test piece 30 respectively, then distances N1, N2 from upper and lower reference surfaces L1-0, L2-0 located over and beneath the test piece 30 are calculated by the similar way to that in the first embodiment, and then results of calculation are stored in a storing means (not shown). At this time, a thickness D0 of the test piece 30 has already been known in advance.

Figure 7B:
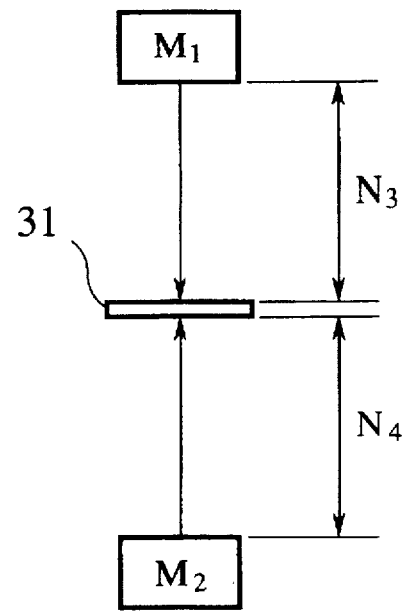
FIG. 7B is a schematic view showing measurement of a measuring object.

In the event that the measuring object is measured actually, a measuring object 31 such as steel sheet is arranged between the measuring equipments M1, M2 positioned as discussed above, as shown in FIG. 7B, and then distances N3, N4 from upper and lower surfaces of the measuring object 31 to the measuring equipments M1, M2 are calculated. Respective differences between the distances N3, N4 and the reference distances N1, N2 stored in the storing means are detected by an arithmetic means (not shown) to thus calculate the thickness of the measuring object 31.

2) Calibration of measuring equipment

However, if high precision measurement is intended (for instance, measurement on the micron order), periodical calibration is needed since infinitesimal variation in the locations of the light source, the lenses, and the linear light sensors used for triangulation, variation in the location of the measuring equipments, and the like because of temperature change of the outside air and thermal influence on material are caused and precise measurement is spoiled.

Figure 8A:
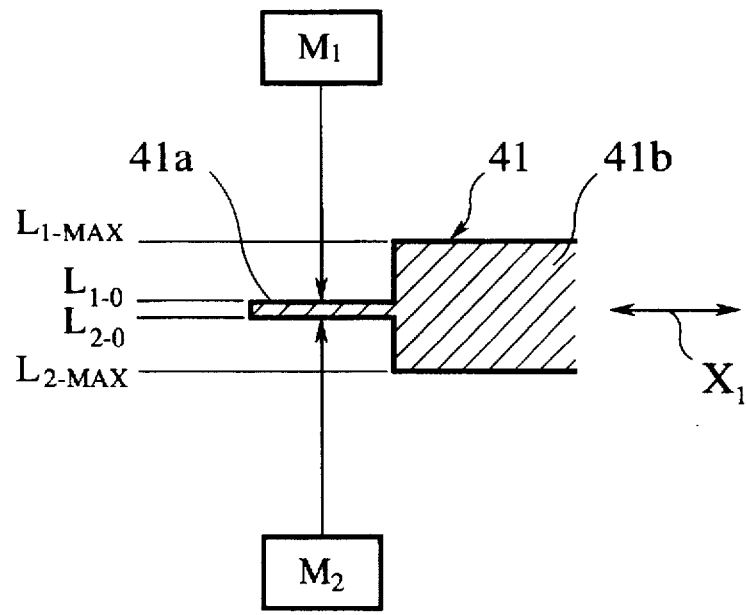
FIGS. 8A and 8B are schematic views showing calibration methods used respectively when a thickness is measured according to the second embodiment of the present invention.

In particular, in case a thickness is measured indirectly like the thickness measurement of the above sheet material, correct calibration becomes more important. In this case, as shown in FIG. 8A, correction is made by using the calibration piece 41. The calibration piece 41 is made up of a thin portion 41a and a thick portion 41b.

Subsequently, at least two points are measured periodically over a full range of the calibration piece 41 (i.e., from the reference surface L1-0 of the thin portion 41a to a reference surface L1-MAX of a thick portion 41b, and from the reference surface L2-0 of the thin portion 41a to a reference surface L2-MAX of a thick portion 41b) and then correction of distance measurement between the measuring equipments M1, M2 and respective reference surfaces is carried out. Upon this calibration, the calibration piece 41 is moved laterally as shown by an arrow X1.

Figure 8B:
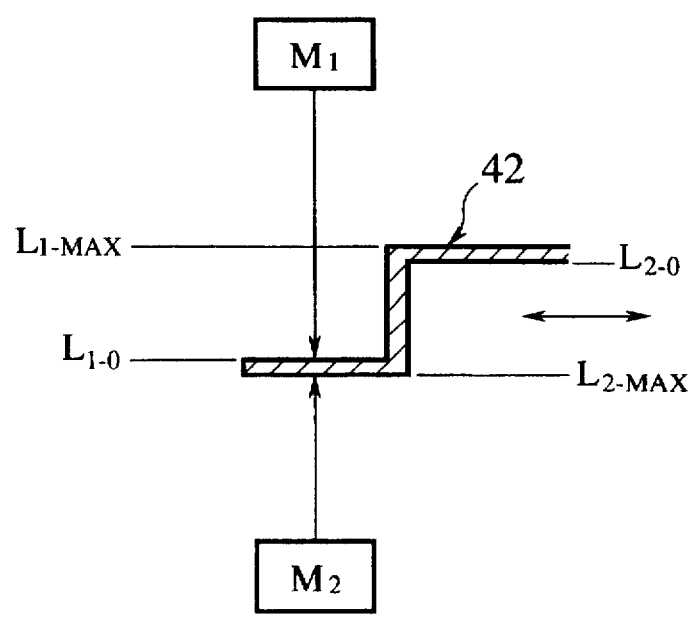

The case shown in FIG. 8B is employed when the reference point L2-0 of the lower measuring equipment M2 is located over the reference point L1-0 of the upper measuring equipment M1. Where L1-MAX, L2-MAX denote limits of maximum measuring ranges. A calibration piece 42 is arranged movably in the horizontal direction such that it does not to interfere the measuring object upon measuring the distance whereas it can calibrate at least two locations by means of its movement upon calibrating the distance.

(C) Third Embodiment

In the event that a thickness of a planar measuring object is to be measured, a steel sheet is inclined at the front end or rear end when the steel sheet is being running through the plant.

Figure 9:
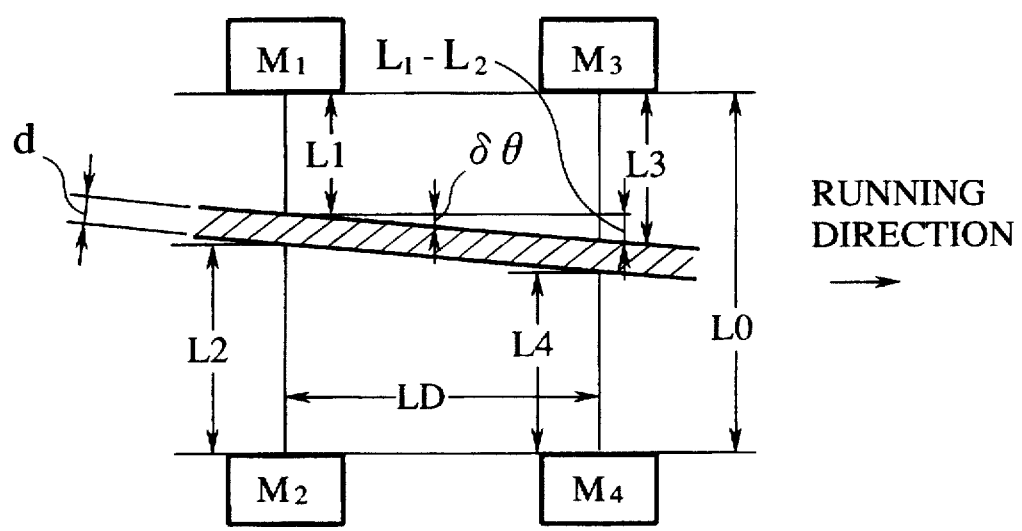
FIG. 9 is a graphical representation of a correction method of an inclination of the measuring object according to the third embodiment of the present invention.

As shown in FIG. 9, assuming that a true thickness of a plane measuring object 51 is d and an inclination of the measuring object 51 is δθ, the thickness d can be measured according to the inclination as if it is increased up to d(1+δθ).

Accordingly, as shown in FIG. 9, if both (or one) of measuring equipments M3, M4 in another pair are provided in the running direction, it is feasible to detect an inclination of the measuring object 51 in accordance with distance calculation.

Such distance calculation will be explained hereinbelow.

Assuming that a distance detected by the measuring equipment M1 is L1, a distance detected by the measuring equipment M3 is L3, and a distance between the measuring equipments M1, M3 is LD, the inclination δθ becomes |L1–L3|/LD and the measured value becomes d(1+δθ). For this reason, the true thickness d can be calculated by subtracting δθ from the measured value. Accordingly, the true thickness can be calculated by correcting the thickness if the inclination can be detected. Still further, if one more measuring equipment M4 can be provided, an inclination of the surface can be calculated on the opposite side.

Since four measuring equipments are provided in FIG. 9, the precision in detecting the inclination can be improved by using an average value of two values as the inclination. In addition, if measuring equipments are still further provided in the running direction and the vertical direction, inclinations can be calculated and corrected in these directions.

As mentioned above, according to the present invention, there are provided the light source for transmitting a plurality of line beams, a linear light sensor for receiving a plurality of images which are formed on a measuring object by the plurality of line beams which are irradiated from said light source to the measuring object, and a distance calculating unit for calculating product-sum operation using a predetermined function based on electric signals corresponding to the plurality of line beams received by the linear light sensor, extracting a function approximating to an images position from a result of the product-sum operation, and calculating a distance to the measuring object, so that plural measurements can be carried out simultaneously, the distance can be measured uniformly throughout the wide range with high precision, the calculations for plural light beams can be carried out simultaneously, and functional values against data of valley portions which lower in precision are rendered small in product-sum operation to let influence on the result be reduced.

In addition, even if movement of images in the horizontal direction occurs, distance measurement can be achieved with good precision by compensating such movement since a plurality of linear light sensors are provided.

Various modifications will become possible for those skilled in the art after receiving the teachings of the present disclosure without departing from the scope thereof.

What is claimed is:

1. A distance measuring apparatus comprising:

a light source for transmitting a plurality of parallel line beams on an X axis to irradiate an object;

a first linear light sensor arranged in a direction Z Perpendicular to said line beams for receiving a plurality of images which are formed by said plurality of line beams on said object and for producing a distribution P(Z) of electric signals generated in accordance with a distribution of said images; and distance calculating means for producing convolutions R(k) by using a predetermined function Q(k–Z) and said distribution P(Z), where said function Q(k–Z) is a predetermined ideal distribution of said distribution P(Z) when said object is placed at a predetermined position, approximating said convolutions R(k) with one of a quadratic and spline curve, determining a 'k' value which gives a peak value of said approximated curve, and calculating a distance to said object by using said 'k' value as a displacement from said predetermined position of said object.

2. A distance measuring apparatus according to claim 1, wherein said light source comprises multiple line beams, a central beam of said light source having an intensity which is greater than intensities of other beams of said light source, said other beams having approximtely equal intensities.

3. A distance measuring apparatus according to claim 1, further comprising:

a second linear light sensor located symmetrically with said first linear light sensor on one side of said object, said second linear light sensor being arranged in a direction Z perpendicular to said line beams for receiving a plurality of images which are formed by said plurality of line beams on said object and for producing a second distribution P'(Z) of electric signals generated in accordance with a distribution of said images; and correction means for calculating a distance through a corrective operation using distances measured using said first and second linear light sensors.

4. A distance measuring method comprising:

transmitting a plurality of parallel line beams on an X axis from a light source;

receiving images which are formed on an object by said plurality of line beams by means of a linear light sensor arranged in a direction Z perpendicular to said line beams and producing a distribution P(Z) of electric signals generated correspondingly to a distribution of said images;

producing a convolutions R(k) by using a predetermined function Q(k–Z) and said distribution P(Z), where said function Q(k–Z) is a predetermined ideal distribution of said distribution P(Z) when said object is placed at a predetermined position;

approximating said convolutions R(k) with one of a quadratic and spline curve;

determining a 'k' value which gives a peak value of said approximated curve; and calculating a distance to said object by using said 'k' value as a displacement from said predetermined position of said object.

5. A distance measuring method comprising:

arranging respective distance measuring apparatuses on each of opposite sides of a sheet-like object, each of said measuring apparatuses comprising:

a light source for transmitting a plurality of parallel line beams on an X axis to irradiate an object;

a linear light sensor arranged in a direction Z perpendicular to said line beams for receiving a plurality of images which are formed by said plurality of line beams on said object and for producing a distribution P(Z) of electric signals generated in accordance with a distribution of said images; and distance calculating means for producing convolutions R(k) by using a predetermined function Q(k–Z) and said distribution P(Z), where said function Q(k–Z) is a predetermined ideal distribution of said distribution P(Z) when said object is placed at a predetermined position, approximating said convolutions R(k) with one of a quadratic and spline curve, determining a 'k' value which gives a peak value of said approximated curve, and calculating a distance to said object by using said 'k' value as a displacement from said predetermined position of said object;

calculating distances from each of said distance measuring apparatuses to said sheet-like object; and calculating a thickness of said sheet-like object based on said calculated distances.

6. A distance measuring apparatus, comprising:

a light source for transmitting a plurality of parallel line beams on an X axis to irradiate an object;

a linear light sensor arranged in a direction Z perpendicular to said line beams for receiving a plurality of images which are formed by said plurality of line beams on said object and for producing a distribution P(Z) of electric signals generated in accordance with a distribution of said images; and distance calculating means for producing convolutions R(k) by using a predetermined function Q(Z+k) and said distribution P(Z), where said function Q(Z+k) is a predetermined ideal distribution of said distribution P(Z) when said object is placed at a regular position, approximating said convolutions R(k) with one of a quadratic and spline curve, determining a 'k' value which gives a peak value of said approximated curve, and calculating a distance to said object by using said 'k' value as a displacement from said predetermined position of said object.

7. A distance measuring method comprising the steps of:

symmetrically arranging respective distance measuring apparatuses relative to a side of an object, each of said measuring apparatuses comprising:

a light source for transmitting a plurality of parallel line beams on an X axis to irradiate an object;

a linear light sensor arranged in a direction Z perpendicular to said line beams for receiving a plurality of images which are formed by said plurality of line beams on said object and for producing a distribution P(Z) of electric signals generated in accordance with a distribution of said images; and distance calculating means for producing convolutions R(k) by using a predetermined function Q(k−Z) and said distribution P(Z), where said function Q(k−Z) is a predetermined ideal distribution of said distribution P(Z) when said object is placed at a predetermined position, approximating said convolutions R(k) pith one of a quadratic and spline curve, determining a 'k' value which gives a peak value of said approximated curve, and calculating a distance to said object by using said 'k' value as a displacement from said predetermined position of said object;

calculating distances from each of said distance measuring apparatuses to said object; and calculating a distance to said object through a corrective operation using distances measured by said respective distance measuring apparatuses.

* * * * *